July 20, 1971  W. SCHULLER ET AL  3,594,256
APPARATUS FOR PRODUCING A WARP BY CLOSED LOOPS
Filed April 18, 1968  6 Sheets-Sheet 1

FIG.1

INVENTOR:
Wolfgang Schuller
Heinz Keib
Günter Wiegand

BY Michael S. Struber
Attorney

FIG. 9

United States Patent Office 3,594,256
Patented July 20, 1971

3,594,256
APPARATUS FOR PRODUCING A WARP BY
CLOSED LOOPS
Wolfgang Schuller and Heinz Keib, Wertheim (Main),
and Gunter Wiegand, Hasloch, Unterfranken, Germany, assignors to Werner Hugo Wilhelm Schuller,
Munich-Grunwald, Germany
Filed Apr. 18, 1968, Ser. No. 725,254
Claims priority, application Germany, Apr. 22, 1967,
G 49,895
Int. Cl. B65h 81/08
U.S. Cl. 156—440         13 Claims

ABSTRACT OF THE DISCLOSURE

Warp threads, ropes, or bands consisting of glass fibers are transported over the center portion of a rotary drum which has circular rows of radial pins at the ends. A rotary thread laying arm lays closed loops of a cross thread, rope, or band consisting of glass fibers, over pairs of pins of the rows so that transverse closed loop cross the warp threads on one side and can be bonded to the same.

BACKGROUND OF THE INVENTION

It is known to reinforce glass fiber mats in longitudinal and transverse directions by attaching reinforcing elements extending in transverse and longitudinal directions by a bonding agent to the mat. The reinforcing elements may be yarns, ropes, or bands consisting of glass fibers, or strands of endless filaments. The German Pat. 977,409 discloses such an arrangement.

In accordance with the British Pat. 927,901, a plurality of reinforcing elements are pulled across the width of a glass fiber mat which moves in longitudinal direction. Such a device would be used following the apparatus disclosed in the German Pat. 825,456. In accordance with the prior art, longitudinal and transverse reinforcing elements are applied to the unbonded mat directly after its production, and a bonding agent is then applied to simultaneously bond the reinforcing elements with the fiber mat, and the fibers of the mat to each other.

The speed at which the reinforcing elements are applied to the mat corresponds to the speed at which the mat is produced of glass fibers, so that the apparatus operates satisfactorily.

A new apparatus for producing a glass fiber mat is disclosed in the German Pat. 976,682 and in the Austrian Pat. 237,822 which substantially increases the output of fiber mats within a time unit, and it has been found that it is not possible to increase the operating speed of the apparatus by which the reinforcing elements are attached to the mat, so that the two devices cannot be combined in a continuous manufacturing operation.

In view of this fact, it becomes necessary to separate the manufacture of fiber mats from the operations for reinforcing the same. Under such circumstances, a web consisting of crossing reinforcing elements can be separately manufactured and applied to the finished fiber web as a reinforcing structure.

Webs of this type are known, for example webs which have crossing threads extending at an angle of 90° or less to each other so that diamond shaped or square openings are formed in the web by the crossing threads. Reinforcing webs of this type have been maufactured of a thread material which, in addition to high tensile strength, also has higher resistance against abrasion, and stretches only very little. Due to the rapid and jerky taking off of the web from a supporting reel, fluffy ropes consisting of glass staple fibers cannot be used for this purpose. Consequently, strands consisting of endless filaments, for example, glass filaments, or textile fibers have been used for this purpose. if staple fibers are used, they are first twisted into a yarn or thread.

Webs of the above-described type are mainly used for reinforcing paper sheets, or for connecting floor tiles. The best reinforcement is produced by a web consisting of longitudinal and transverse threads crossing each other at right angles.

The term "thread" will be used in the present application to cover yarn, ropes, bands, and other elongated flexible elements which may be twisted or not twisted, and consist of filaments or short fibers, and more particularly of glass or other mineral fibers.

SUMMARY OF THE INVENTION

It is one object of the invention to produce a bonded web of crossing threads which is suitable for reinforcing a mat, for example a glass fiber mat, when bonded to the same.

Another object of the invention is to provide apparatus for forming a reinforcing web of fluffy threads, ropes or bands consisting of staple fibers.

Another object of the invention is to apply a reinforcing web consisting of crossing fluffy ropes having bristle-like projecting fibers to a fiber mat so that the fibers of the rope penetrate into the mat and homogeneously anchor the reinforcing web in the mat.

Another object of the invention is to form a web of crossing and bonded threads or fluffy ropes which can be used without attachment to a mat.

Another object of the invention is to provide apparatus for economically and rapidly producing a bonded web consisting of crossing threads.

With these obects in view, the present invention relates to apparatus for producing a bonded web of crossing threads, ropes or the like, preferably consisting of glass fibers or filament, or of a like material.

One embodiment of the apparatus of the invention comprises transporting means for transporting a plurality of warp threads forming a warp in a working plane in longitudinal direction of the warp threads, a driven rotary holding device, such as a drum, having an axis of rotation transverse to the warp direction and including a center portion below the working plane and under the warp, and a pair of endless rows of holding means mounted on the end portions of the drum, and moving in the working plane in the warp direction on opposite sides of the warp, thread laying means including a rotary arm having a thread guide for a cross thread and mounted for turning movement for laying loops of the cross thread about pairs of holding means across the warp threads so that transverse portions of cross thread cross the warp threads, drive means for rotating the holding device and the rotary thread laying arm. Bonding means are provided for applying a bonding agent to the transverse portions of the cross thread and to the warp threads for bonding the same to each other whereby a web is formed.

In the preferred embodiment of the invention, the holding means are pins mounted in bores of the end portions of the drum and being movable between a radially projecting operative position, and a retracted inoperative position. Eccentric cam means are provided for moving the pins during each revolution between the retracted and operative positions so that the thread laying means, which preferably include a rotary arm having a thread guide at the end thereof, lays thread in loops about pins in the operative position whereby the finished web easily separates from the drum when the pins are retracted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

A supporting frame 1 carries supply reels 2 for supplying upper warp threads 3, and lower supply reels 4 for supplying lower warp threads 5. Warp beams may be substituted for supply reels 2 and 4. The upper warp threads 3 are guided over guide rollers 6, 7, 8, 9, and the lower warp threads 5 are guided over guide rollers 10, 11, 12, 13 and 14 where they form an upper warp and a lower warp. The guide rollers 9 and 14 have circumferential guide grooves 16 and 17, best seen in FIG. 3, which are offset in axial direction so that the warp threads 5 are offset relative to the warp threads 3.

A rotary drum 15 receives the lower warp delivered by the guide roller 14 which then passes between the transporting rollers 54 and 55.

Figure 3:
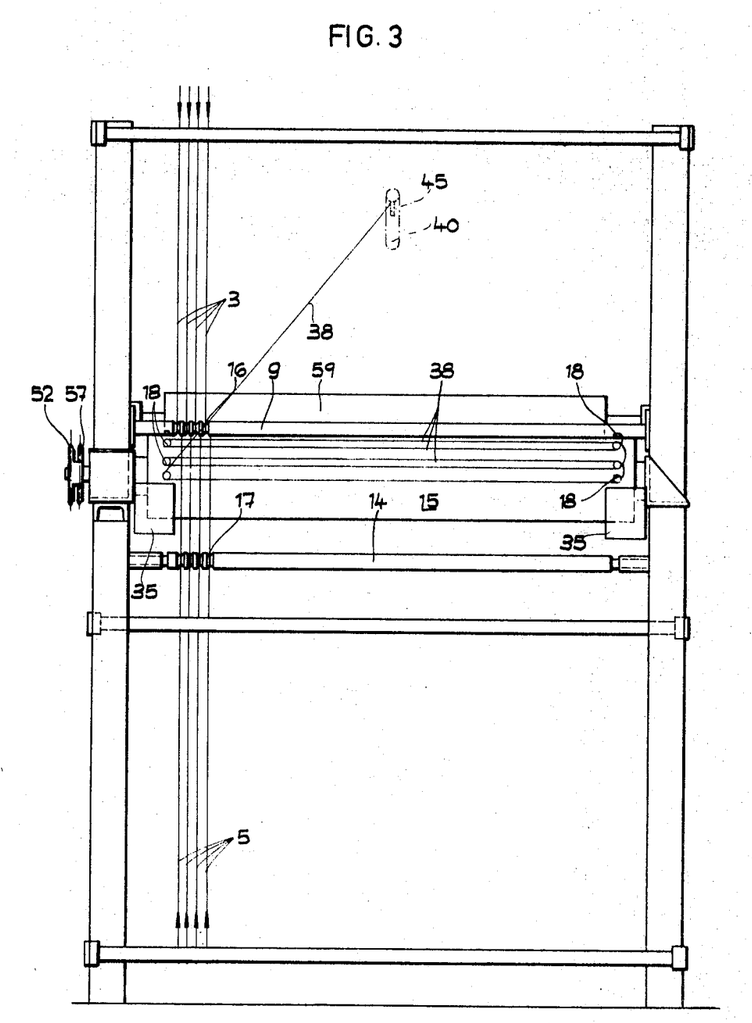
FIG. 3 is a rear elevation taken in the direction of line III—III in FIG. 1.

As best seen in FIG. 3, drum 15 has a center portion extending across the upper and lower warp threads and end portions located in opposite sides of the same. Each end portion has a circumferential row of holding pins 18 between which the lower warp threads 5 pass over the upper periphery of the center drum portion. A rubber roller 59 cooperates with the center drum portion to guide the upper warp thread 3 towards the transporting rollers 54 and 55. The upper and lower warps move in a working plane between rollers 59 and 55.

A motor 47 drives a transmission 48 and through a chain drive 49 a pair of bevelled gears 51 by which another chain drive 50 is driven. Chain drive 50 rotates a hollow shaft 41 which is open at one end 42 and carries a rotary thread laying arm 40 provided at the free end with a thread guide 45. A cross thread 38 is supplied from a bobbin 39 and guided through the open end 42 into the hollow shaft 41 and out of the same along arm 43 to the thread guide 45. Consequently, the thread laying device 40 rotates about the axis of the shaft 41 in a plane transverse to the working plane.

Figure 1:
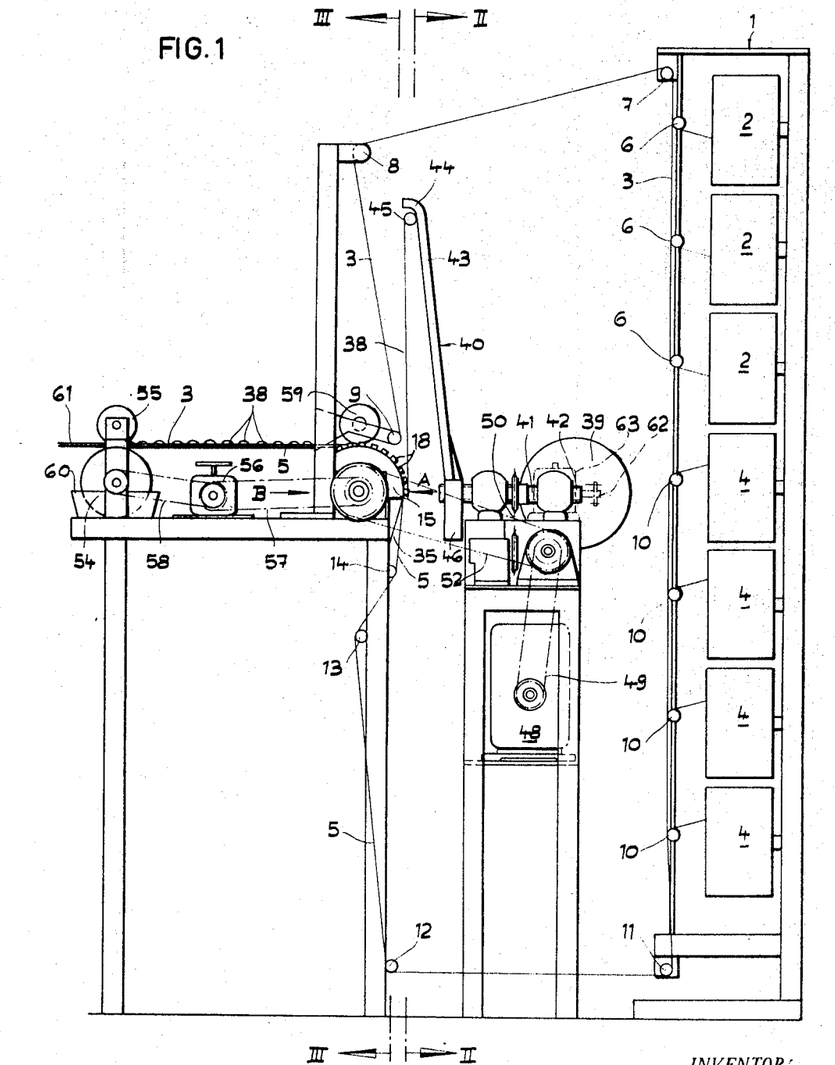
FIG. 1 is a side elevation illustrating an embodiment of the invention.
Figure 2:
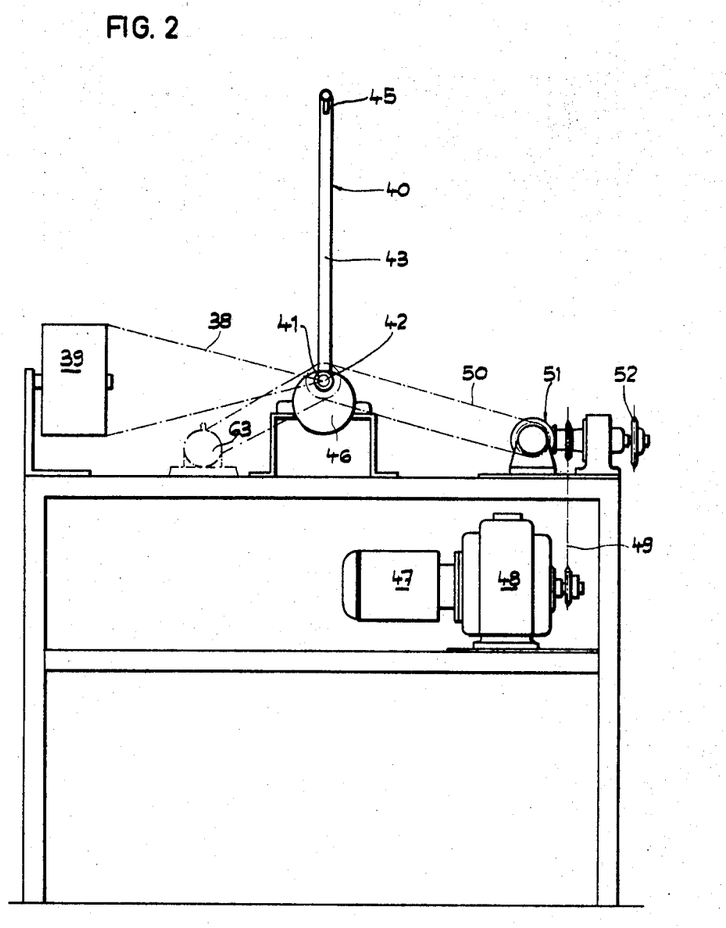
FIG. 2 is a front elevation taken along line II—II in FIG. 1.

As best seen in FIGS. 1 and 2, chain drive 49 also drives a chain drive 52 connected with the shaft of drum 15. Another chain drive 57 connects this shaft with a varible transmission 56 which is connected by another chain drive 58 to the shaft of transporting roller 54. By adjusting the transmission 56, the speed of transporting roller 54 can be varied and made different from the rotary speed of drum 15.

During rotation of the thread laying device 40, loops are formed about correlated pairs of pins 18, as best seen in FIG. 3, and form transverse portions 38 extending across and above the warp threads 5 and under the warp threads 3 when transported by drum 15 and roller 59, and transporting rollers 54, 55 in the working plane. The arm 43 of thread laying device 40 is counterbalanced by a weight 46, but a second thread laying arm may be substituted for the balancing weight.

Since the drum 15 and the thread laying device 40 are driven from the same motor, they operate in synchronism.

Figure 4:
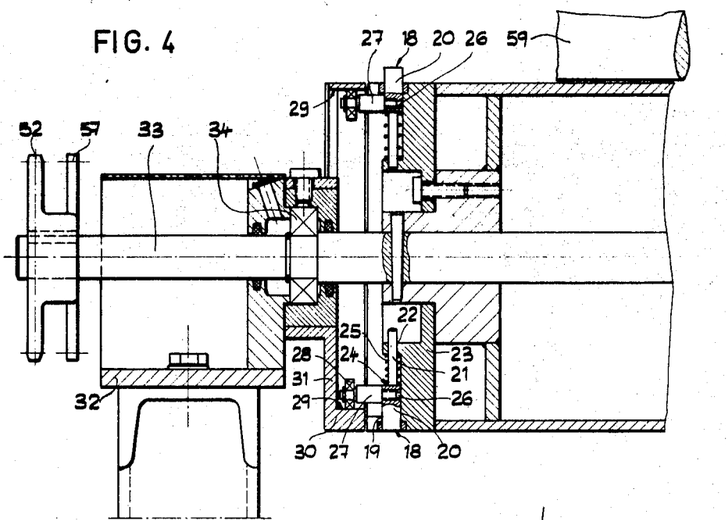
FIG. 4 is a fragmentary sectional view on an enlarged scale illustrating a detail of a holding device for a cross thread.
Figure 5:
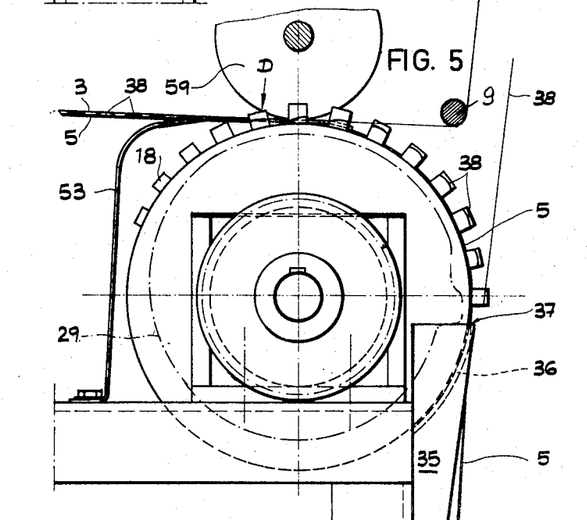
FIG. 5 is a fragmentary side elevation illustrating a detail of FIG. 1 on an enlarged scale.

Drum 15 with holding pins 18 constitutes a rotary holding device for the cross thread 38. As best seen in FIGS. 4 and 5, each holding pin has a holding portion 20 of greater diameter, and a mounting shaft portion 21 of smaller diameter guided in bores 22 of an annular support of an end member 23 which is detachable from the center portion of drum 15. Each holding pin has a shoulder 24 which a spring 25 about which also abuts the annular support and biasses the holding pin 18 outward in radial direction.

A cam follower means 27 is threaded into the portion 20 of each holding pin 18 and carries a roller, for example a ball bearing 28 which cooperates with an inner endless cam track 29 of a flange 30 secured to a disc 31 which is fixed on a bearing block 32 in which shaft 33 of drum 15 is mounted in ball bearings 34.

The outline of the inner cam track 29 is best seen in FIG. 5 which shows in chain lines the eccentric position of cam track 29 in relation to the circular row of holding pins 18 and cam followers 27. Due to the configuration of cam track 29, holding pins 18 are pushed out to a projecting operative position by springs 25 when each holding pin 18 moves through a horizontal plane passing through the axis of rotation of drum 15, where a recess is provided in the cam track. Thereupon, the holding pins 18 remain in the outer operative position until passing through the working plane between drum 15 and roller 59 and are then gradually retracted into drum 15 so that the holding pins are operative only in the region between the points A and B in FIG. 1. A stationary thread guide 35 is provided in the region B of drum 15 where the holding pins 18 advance to the operative position. A portion 36 of guide 35 forms a tangential apron to drum 15 and prevents premature movement of holding pins 18 to the operative projecting position. Portion 36 could be constructed to form a cam for pressing holding pins 18 against the action of springs 24 to the inner retracted position until the respective holding pin 18 passes the edge 37 and is pushed outward by spring 24. In such an arrangement, the guide cam track 29 and the cam follower means 27 may be omitted. However, the illustrated embodiment is preferred, since the simplified embodiment without cam track and cam followers causes great friction and wear of the holding pins.

During the operation of the apparatus, the drum 15 rotates so that the holding pins 18 move substantially at the same speed as the warps 3 and 5 while the rotating thread laying arm 50 forms loops about pairs of holding pins 18.

As best seen in FIGS. 6 to 9, each loop is closed and passes over a holding pin 18b on the left side, and over a holding pin 18a on the right side of drum 15 as viewed in the drawing whereupon the cross thread is laid over the next following pin 18c.

Figure 6:
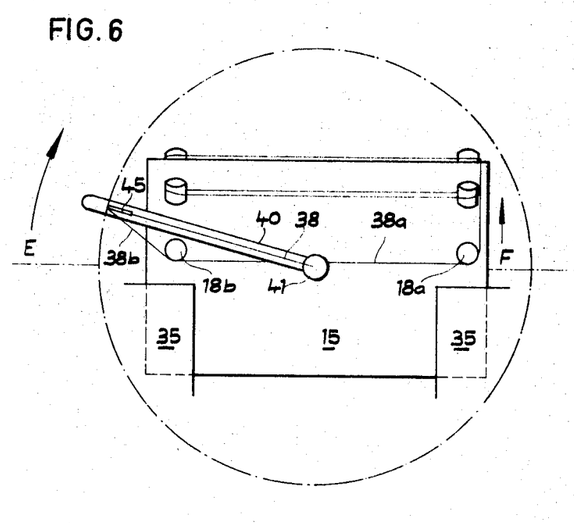
FIGS. 6, 7, 8, and 9 are fragmentary rear views illustrating different operational positions of a device for laying the cross thread.

In the position of FIG. 6, a transverse portion 38a of cross thread 38 has been laid between two holding pins 18a, 18b by the thread laying arm 40, 45 which rotates in the direction of the arrow E. Thereupon a loop is laid about pin 18b.

Figure 7:
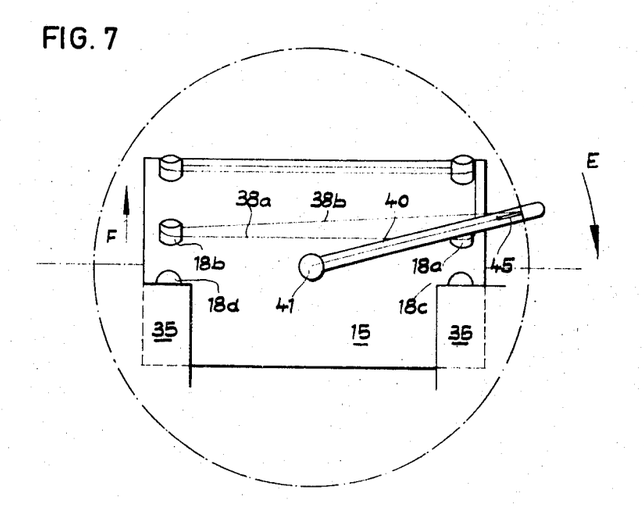

In the position of FIG. 7, the thread laying arm has turned 150° and is about to loop a thread portion 38b about pin 18a which has travelled with pin 18b in the direction F.

Figure 8:
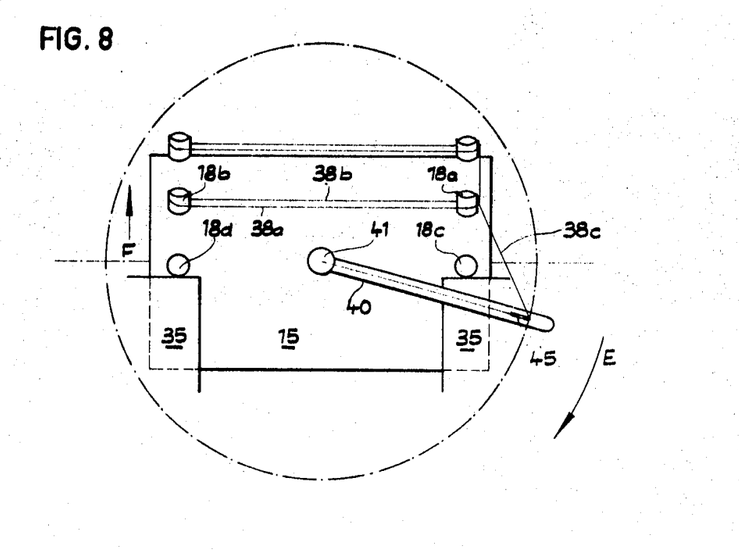
Figure 9:
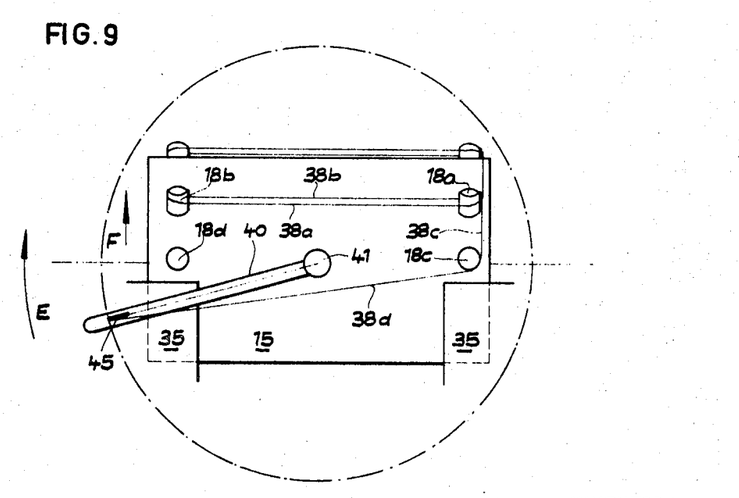

In the position of FIG. 8, thread laying arm has turned 30° so that the cross thread 38 is looped a second time about pin 18a, closing the loop about pins 18a, 18b so that the transverse thread portions 38a, 38b are parallel. Another thread position 38c is about to be laid about pin 18c and is tensioned during the following rotation of the thread laying arm between pins 18a and 18c, as shown in FIG. 9.

When the thread laying arm 40, 45 returns to the position of FIG. 6, thread portion 38d is laid between pins 18c and 18d and tensioned in the position in which thread portion 38b is shown in FIG. 6.

The illustration of FIGS. 6 to 9 is simplified and the transverse thread portions are actually spaced smaller distances corresponding to the diameter of pins 18 so that the transverse weft-like thread portions are uniformly spaced.

Instead of the counterweight 46 on shaft 41, a second diametrically arranged thread guiding arm with a thread guide 45 can be provided on shaft 41 so that during each revolution of shaft 41, four instead of two cross thread portions can be laid onto the lower warp threads 5. This requires mounting of the supply reels for the cross thread on the thread laying arms in order to prevent entanglement of the two cross threads. When two thread laying arms 43 are used, the cross thread loops intersect at more points than in the illustrated arrangement, since on one end of drum 15 one holding pin, and at the other end two holding pins separated by an intermediate holding pin are looped by the cross threads. Since the loop portions at the lateral edges of the web are later cut off, this causes greater waste.

A single thread guiding arm operating at 250 revolutions per minute results in a delivery speed of 5 meters per minute for a web having a width of 1 meter and a distance of 10 millimeters between adjacent cross thread portions. Therefore, it is hardly economical to operate with more than four crossing thread guides although such a construction is technically feasible and has advantages regarding the take off of the cross thread from the supply reels since the cancelled forces exerted on the cross thread are reduced at a lower rotary speed of the thread laying means.

If fluffy fiber ropes are used, it has been found advantageous to provide a lifting means 53, shown to be a bail bent of steel wire and located under the web of following the drum 15. The loops of the cross thread are lifted off the holding pins 18 by the lifting means 53 while the rubber roller 59 retains the web whose longitudinal and transverse threads or ropes are not yet bonded to each other. The function of roller 59 assures that the transverse threads remain straight and tensioned during the lifting off of the end loop portions from the holding pins so that the warp threads remain parallel to each other, the transverse thread portions remain parallel to each other, and the warp threads and cross threads remain perpendicular to each other, assuring a neat appearance of the web.

When the web with the loosely laid threads or ropes passes through the transporting rollers 54, 55, it is moistened by a bonding agent by roller 54 which is partly immersed into a liquid bonding agent in a trough 60 so that the transverse threads are bonded to the longitudinal warp threads to form a bonded web 61. The bonding agent may also be directly applied by spraying nozzles following roller 55.

After the bonding agent has been applied, the web is guided into a drying chamber, not shown, where it is wound up on a reel. The web is taken off the reel for application to a glass fiber mat and is bonded to the same, but the web can also be used without a glass fiber mat.

As mentioned above, the end portions 23 of the holding drum 15, together with holding pins 18 are detachably mounted and can be exchanged for other end portions provided with holding pins of greater or smaller diameter, or spaced different distances in circumferential direction.

In this manner, the holding device 15, 18 can be adjusted to produce webs in which the weft-like cross thread portions are spaced between 5 millimeters–15 millimeters. If even smaller distances are required, which is possible if glass silk strands or textile threads are used, very thin holding pins can be used so that the transverse cross thread portions are spaced less than 5 millimeters. Since the great number of pins takes up the space available in the interior of the drum 15, it is preferred to mount the holding pins rigid on the drum if very thin holding pins are to be used.

The radial movement of the holding pins of the illustrated embodiment serves mainly the purpose of preventing damage to the sensitive threads, ropes or bands consisting of staple glass fibers so that the cross thread can be reliably laid about a holding pin without engaging or touching the adjacent holding pin. While this could be accomplished by a guide member, the contact of the cross thread with the guide member would also frictionally abrade the cross threads.

If a very strong material is used for the threads, even thick holding pins can be rigidly mounted on the drum, which simplifies the apparatus and reduces its cost.

The distance between adjacent cross thread portions of the web cannot only be influenced by using holding pins of different diameter, but also by increasing or reducing the peripheral speed of transporting rollers 54, 55 in the working plane as compared with the peripheral speed of drum 15.

Such adjustment of the speed is obtained by the variable transmission 56. Assuming that the delivery speed of transporting rollers 54, 55 and the speed of the web is reduced to a speed less than the speed at which the cross thread is laid and transported by the holding pins of drum 15 into the working plane, the laid cross threads move at a higher speed into and between the upper and lower warp threads than the speed at which the warp threads are transported by the transporting rollers 54, 55, and consequently the transverse thread portions are more closely spaced.

Evidently, instead of the variable transmission 56 connecting the main drive with the transporting rollers 54, 55, a regulatable drive means can be provided for transporting roller 54. In this manner, a web of such density can be produced that it has sufficient strength for use without a carrier mat, and actually can be substituted for a reinforced fiber mat. Due to the high strength and absorbtion capacity of a web in accordance with the invention, it can be used instead of webs of vegetable origin, for example, jute fibers. A glass fiber web produced in accordance with the invention is extremely suitable for roofing webs and sealing webs where it has an advantage over jute webs since it has a longer useful life and is not subject to decay.

As explained above, it is preferred to use ropes and bands consisting of glass fibers for making the web. Such ropes are fluffy which causes a very reliable anchoring of the web on a reinforced fiber mat, and are also highly absorbent which is desirable for many uses. On the other hand, glass fiber ropes have only low tensile strength so that it is advisable to use as a cross thread, which due to the high rotary speed of the thread laying arm and due to the laying of loops about the holding pins is subjected to great and sudden tensile stresses, ropes or bands which have been treated and strengthened before laid into the web. The ropes or threads may be slightly twisted, or treated with a bonding agent or other material by which the fibers are held together. It is also possible to provide a spun glass envelope, or a glass core for the fiber ropes.

It is important that the loose and fluffy character of the fiber rope is not lost by the pre-strengthening treatment, since the bonding with a glass fiber mat may be impaired.

As noted above, the provision of several thread laying means reduces the wear of the cross thread. An increase of the strength of the fiber ropes or fiber bands by twisting can be accomplished in a simple manner by inserting into the hollow shaft 41 a second tubular shaft 62, shown in FIG. 1 in chain lines, which is driven by a variable speed motor 63 at a far higher rotary speed than the hollow shaft 41 and thus rapidly rotates the outer layer of a cross thread guided therethrough, and the surrounding envelope, so that the outer fluffy rigidly projecting fibers of the cross thread are pressed toward the core and wound spirally about it. In this manner, it is avoided that the fluffy thread or rope is damaged by frictional engagement with the rotating thread laying means 40.

Any kind of fluffy fibrous material can be used for the longiutdinal warp threads, since the same are uniformly and comparatively slowly taken off the supply reels. The longitudinal tensile strength of the warp threads must correspond to the desired longitudinal tensile strength of the finished web.

In order to facilitate the supervision of the operation, photo sensing means may be provided for checking the warp threads and cross threads so that the apparatus is stopped upon thread breakage, and the condition indicated by a signal.

It will be understood that each of the elements described above, or two or more together, may also find a useful application in other types of web producing apparatus differing from the types described above.

While the invention has been illustrated and described as embodied in an arrangement for producing a bonded web including a rotary thread laying arm and a rotary thread holding device with holding pins at the ends thereof, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An apparatus for producing a bonded web, comprising first supply means for supplying a plurality of warp threads forming a warp; transporting means for transporting said warp in a working plane in longitudinal direction; a driven rotary holding device having an axis of rotation transverse to said direction, and including a center portion below said working plane and under said warp, a pair of end portions located on opposite sides of said warp, and a pair of endless rows of holding means mounted on said end portions, respectively, said holding means moving in said working plane in said direction; second supply means for a cross thread; thread laying means including a thread guiding arm rotatable about an axis and having an inner end to which said cross thread is supplied, and an outer end moving about a circular path in a plane, and having a thread guide for said cross thread so that said cross thread is guided along said arm from said inner end to said thread guide, said arm being mounted for turning movement in a plane transverse to said working plane and to said direction for laying loops of said cross thread about pairs of said holding means of said endless rows on top of and across said warp threads so that transverse portions of said loops cross said warp threads; and drive means for operating said holding device and said thread laying arm in timed relation.

2. The apparatus claimed in claim 1, wherein said thread laying means include a tubular shaft means; wherein said inner end of said thread guiding arm is secured to said shaft means so that said thread guide on said outer end revolves about said circular path; and wherein said cross thread is guided from said supply means by and through said tubular shaft means to said inner end, and wherein said thread guiding arm guides the cross thread to said thread guide.

3. The apparatus claimed in claim 2, wherein said tubular shaft means includes an outer shaft rotating with said inner end of said arm, and an inner shaft located in said outer shaft and being driven at a higher rotary speed than the same; and wherein said cross thread passes through said inner shaft.

4. The apparatus claimed in claim 2, wherein said thread guiding arm is tubular and has an open inner end; and wherein said cross thread is guided from said tubular shaft means into said open inner end and through said tubular arm to said thread guide on said outer end of the same.

5. The apparatus claimed in claim 1, comprising bonding means following said holding device in said direction for applying a bonding agent to said transverse portions and to said warp threads for bonding the same to each other whereby a web is formed.

6. The apparatus of claim 1 wherein said holding means are mounted in said end portions for radial movement between a retracted position and an outwardly advanced operative position; and comprising operating means for moving said holding means between said retracted and operative positions.

7. The apparatus of claim 6 wherein said holding device is a drum; wherein said end portions are tubular, wherein each end portion is formed with a circumferential row of radial bores; and wherein said holding means are pins mounted in said bores, respectively, for radial movement between said retracted position located in said bores and said operative position projecting radially outward from said bores.

8. The apparatus claimed in claim 7 wherein said operating means include eccentric cam means, cam follower means connected with each of said pins and being operated by said eccentric cam means to move pins above the axis of rotation of said holding device and said drum to said operative position so that pins in said operative position move along said warp in said working plane; and spring means for urging said pins to said retracted position.

9. The apparatus claimed in claim 7 wherein said tubular end portions are detachably mounted on said center portion and adapted to be exchanged with said pins for other end portions.

10. The apparatus claimed in claim 1 including stationary thread guide means adjacent said rotary holding device for guiding said cross thread from said thread guide of said thread laying arm onto said holding means.

11. The apparatus claimed in claim 1 comprising a thread lifting means following said holding device in said direction and having a lifting portion located under the newly formed web in said working plane for lifting the newly formed web off said holding device and said holding means.

12. The apparatus claimed in claim 1 wherein said first supply means include means for supplying upper and lower warps to said holding device above and below said transverse portions of said crossing thread, respectively; wherein said upper and lower warps each consists of parallel wrap threads; and comprising upper and lower transverse roller means formed with circumferentially extending grooves for guiding said upper and lower warp threads, respectively, the grooves of said transverse roller means being offset in axial direction so that the warp threads of said upper and lower warps are offset in relation to each other.

13. The apparatus claimed in claim 1 wherein said transporting means include a pair of cooperating transporting rollers for transporting the web composed of said warp threads and said transverse portions of said cross thread away from said holding device toward said bonding means; and drive means for driving said transporting rollers independently of the drive means of said holding device, and including an adjustable variable transmission for varying the speed of said transporting rollers.

References Cited

UNITED STATES PATENTS

| 2,380,823 | 7/1945 | Brown | 156—440 |
| 2,797,728 | 7/1957 | Slayter et al. | 156—180X |
| 2,962,080 | 11/1960 | Hirsch | 156—440 |

BENJAMIN A. BORCHELT, Primary Examiner

J. J. DEVITT, Assistant Examiner

U.S. Cl. X.R.

156—180